United States Patent [19]

Hurst et al.

[11] Patent Number: 5,423,683
[45] Date of Patent: Jun. 13, 1995

[54] INSTRUMENT SIMULATOR SYSTEM

[75] Inventors: G. Samuel Hurst; Harvel A. Wright; John D. Morris, all of Knoxville, Tenn.

[73] Assignee: Consultec Scientific, Inc., Knoxville, Tenn.

[21] Appl. No.: 152,017

[22] Filed: Nov. 15, 1993

Related U.S. Application Data

[63] Continuation-in-part of Ser. No. 974,754, Nov. 13, 1992, Pat. No. 5,304,065.

[51] Int. Cl.[6] .............................. A61B 6/00
[52] U.S. Cl. .................... 434/218; 434/219; 364/413.26; 250/370.07
[58] Field of Search .............................. 434/218, 219; 250/356.1, 356.3, 370.07, 492.3; 378/19, 162; 364/413.26

[56] References Cited

U.S. PATENT DOCUMENTS

| | | |
|---|---|---|
| 4,582,491 | 4/1986 | Monterth . |
| 4,760,260 | 7/1988 | Walsh et al. . |
| 4,910,149 | 3/1990 | Okube et al. . |
| 4,917,611 | 4/1990 | Whalen et al. . |
| 4,973,913 | 11/1990 | Oda . |
| 5,142,559 | 8/1992 | Wielopolski et al. . |

Primary Examiner—Richard J. Apley
Assistant Examiner—Glenn E. Richman
Attorney, Agent, or Firm—Sughrue, Mion, Zinn, Macpeak & Seas

[57] ABSTRACT

A health physics instrument simulator system permitting an operator to simulate measurement of radiation levels of a plurality of radiation types includes a memory for storing first data corresponding to an n-dimensional training space representing a predetermined physical location, second data defining a radiation source including source strength, source type and source location with respect to the training space and radiation intensity data based on the second data, where each of the radiation intensity data corresponds to one respective location in the training space, a selecting device for selecting a predetermined simulated radiation sensing instrument, a pointing device for identifying a location within the training space defining a current location of the simulated radiation sensing instrument and a display for displaying both an instrument display corresponding to the simulated radiation sensing instrument and radiation intensity data corresponding to the current location in the training space. Methods for operating a health physics instrument simulator system including a computer and a display are also disclosed.

9 Claims, 7 Drawing Sheets

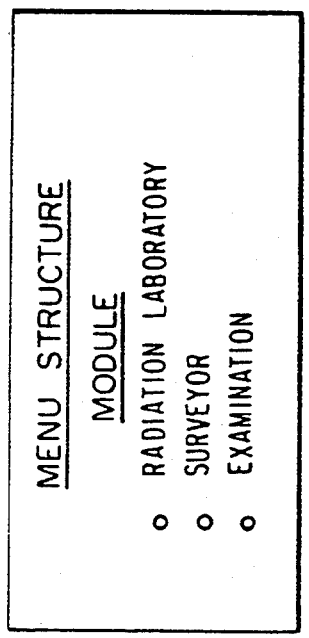
FIG. IA
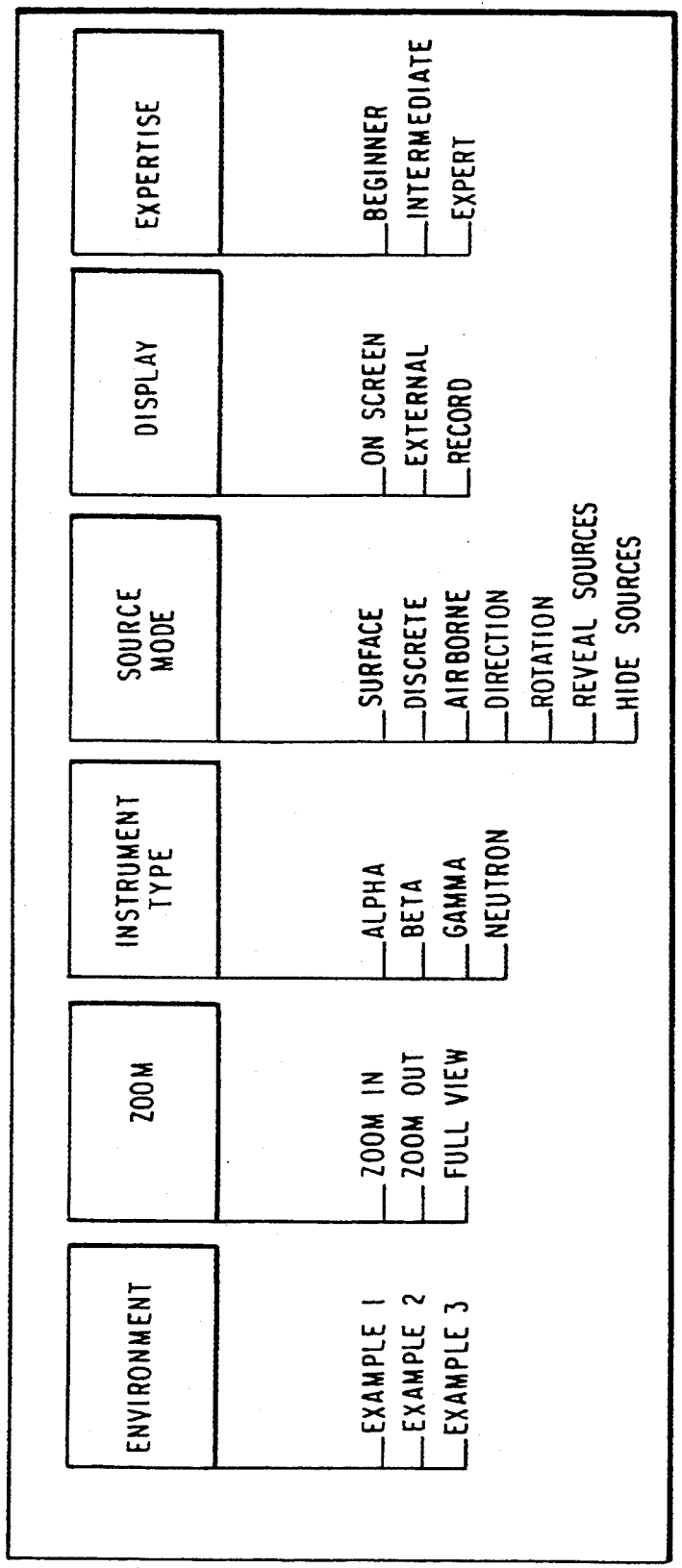
FIG. IB

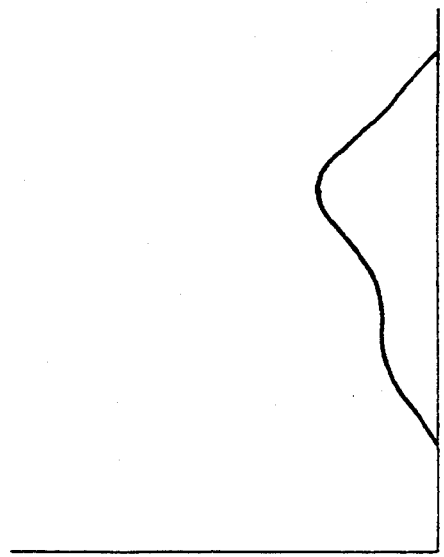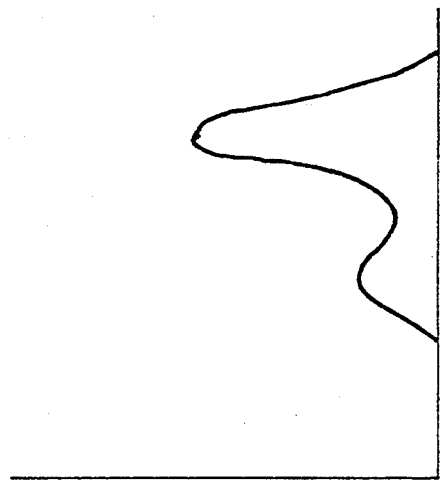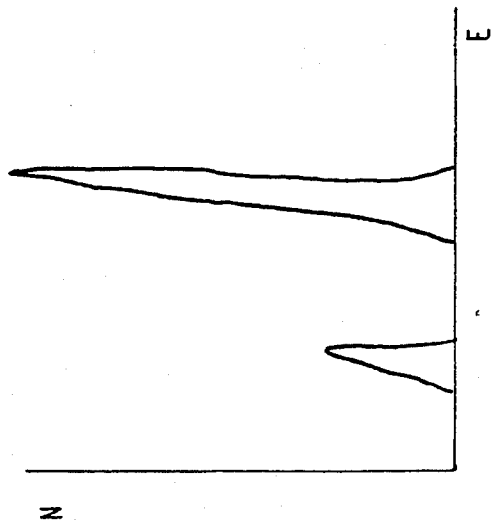

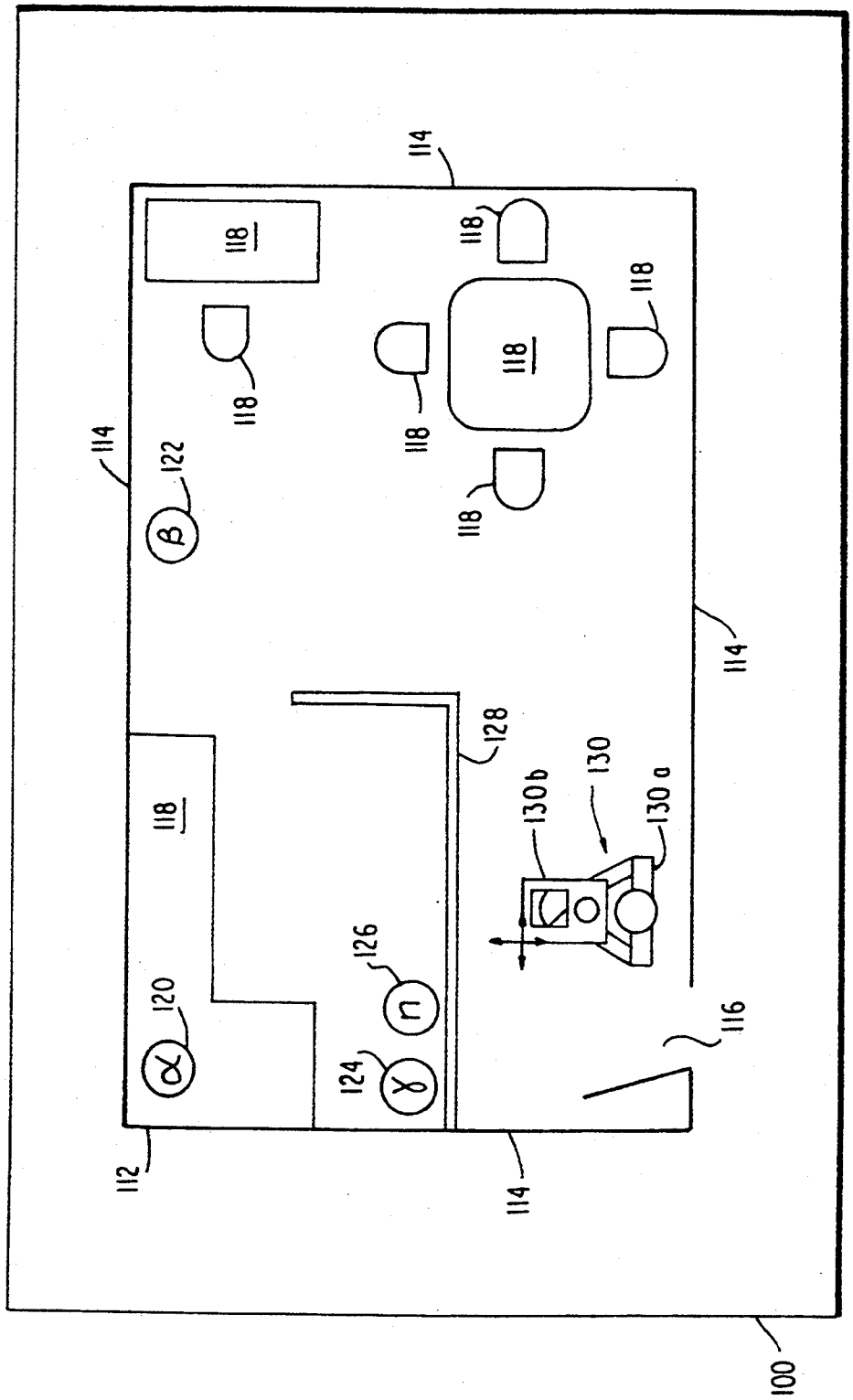

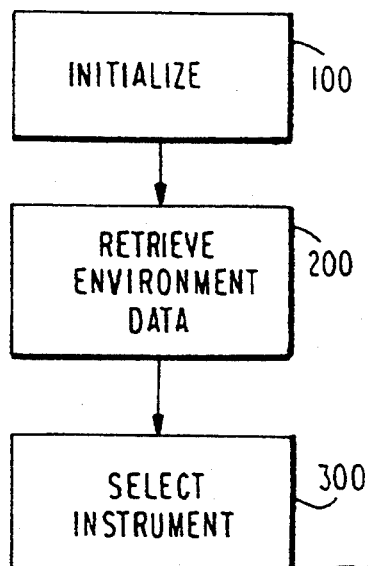
FIG.8A
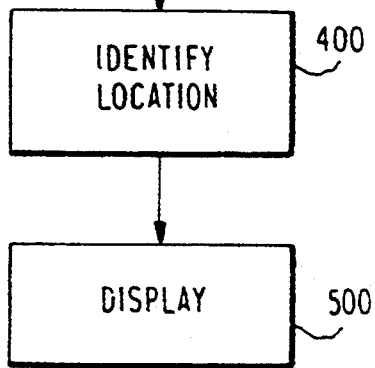
FIG.8B
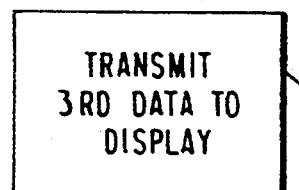
FIG.8C
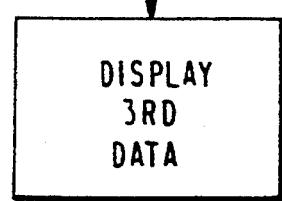
FIG.8D
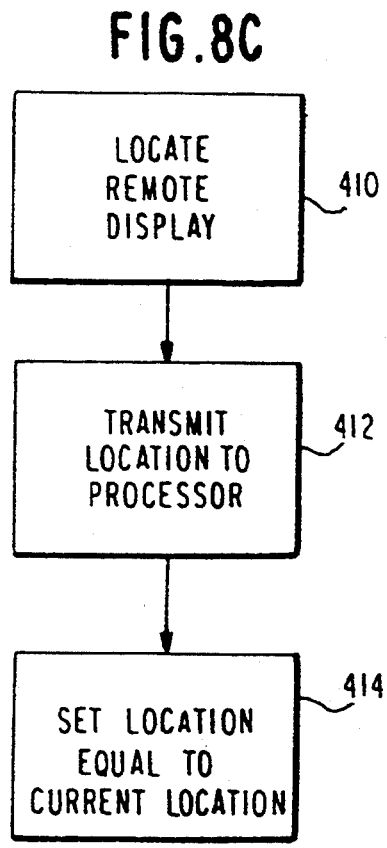

INSTRUMENT SIMULATOR SYSTEM

RELATED APPLICATION

The present application is a continuation-in-part of application Ser. No. 07/974,754, filed Nov. 13, 1992, now U.S. Pat. No. 5,304,065.

FIELD OF THE INVENTION

The present invention relates generally to an instrument simulator system. More specifically, the present invention relates to a health physics instrument simulator system wherein data defining a training area and data defining one or more radiation sources are used to provide a simulated radiation level indication on a simulated radiation sensing instrument. Methods for simulating radiation sensing instruments and radiation level readings on a computer system are also disclosed.

BACKGROUND OF THE INVENTION

With increased concern for environmental quality and safety for both occupational workers and the public, and the associated massive cleanup of the nation's government facilities, more personnel will be needed with qualifications in dealing with hazardous materials. Health physics is one part of this effort, requiring individuals to be trained in radiation exposure control and dosimetry. The number of individuals trained in health physics is not keeping pace with the demand for their services. Recent labor studies predict a shortage of health physicists during the next several decades. Failure to prevent this shortage will leave industrial nations at a disadvantage in a number of areas including nuclear power, radiological waste management, nuclear medicine, etc. One solution to this shortage is to expand existing training programs and to create new training programs. Another solution is to improve the effectiveness of existent training programs.

Training is presently done in one of two ways: with controlled radiation sources or in actual hazardous environments. As a consequence, training in health physics is expensive and inefficient. Furthermore, training can be hazardous for those involved and thus requires careful supervision. As the need for these qualified individuals increases and more people are involved with this type of training, unnecessary exposure and the danger of over-exposure during training increases.

A major part of health physics training is devoted to learning how to use radiation detection and monitoring instruments. This is accomplished by (1) using actual instruments and actual radiation sources in a classroom laboratory situation and/or (2) on-the-job training. In either case, training using actual radiation sources involves needless exposure to health physicist trainees. In addition, training using actual radioactive material increases the cost and difficultly associated with training, since the radioactive sources used in the training program require careful control and experienced health physics personnel to handle and use the radioactive sources.

Health physics instrument simulators are known. For example, U.S. Pat. Nos. 3,643,166, 3,613,259, 3,266,847 and U.S. Pat. No. Re. 27,078 disclose health physics instrument simulator systems and methods whereby radiation simulation is achieved using radio frequency attenuation of one or more signals. On the other hand, U.S. Pat. No. 2,900,740 discloses a system for radiation simulation using phosphor materials while the U.S. Pat. No. 4,500,295 discloses a simulated alpha particle detector operated by magnets.

Other U.S. patents teaching health physics instrument simulators include U.S. Pat. No. 4,917,611, which discloses transmitting an assumed radiation dose rate from a first instrument operated by an instructor to a second device simulating a radmeter, wherein an eight digit number is determined by the second device corresponding to dose rate. In particular, the two (2) most significant digits of the eight digit number correspond to meter range while the six (6) least significant digits correspond to a value indicating meter movement within the selected range. This patent also discloses improvements in simulation by permitting a wide range of dose rates to be displayed on a single simulated instrument. However, U.S. Pat. No. 4,917,611 discloses a system in which the student is "tethered" to an instructor with radio waves. Dose rate information is selected by the instructor and transmitted to stimulate a multi-range instrument held by the student.

Japanese Kokai No. 84-132381, on the other hand, discloses a health physics training apparatus wherein a room and a computer system are employed. In particular, a buried grid system is located below the training room floor and a combination transmitter/receiver held by the student is tracked using the grid. The computer determines the simulated dose to the student and transmits a warning signal to the student. The computer system captures data for later evaluation after the training session has been completed.

U.S. Pat. No. 4,582,491 discloses a catastrophic event training system permitting designation of a training area by grid coordinates, designating a single source, such as nuclear device or bomb, at a grid location within the training area, setting an exercise start time, calculation a plurality of contamination levels within the training area based on the detonation of the nuclear device, height above ground, etc., and displaying the calculated contamination level in response to entry of a grid location in the training area. Thus, U.S. Pat. No. 4,582,491 discloses a simulator most appropriate for training in areas of contamination from weapons, chemicals, etc. It uses a storage medium for an assumed field of contamination and a location input means such as a keyboard and a real-time clock so that the trainee can be updated on dose rate and total dose.

Health physics instrument simulator systems using a computer, such as a PC, to store information on radiation fields or, alternatively, to calculate these quantities in near real-time from arbitrary distributions of sources, which permit the student to interact with this information in a number of convenient ways, have not been produced.

SUMMARY OF THE INVENTION

A general object of the present invention is to provide an improved simulator system.

Another object of the present invention is to provide an interactive health physics instrument simulator system whereby health physics trainees can receive realistic training using a plurality of simulated radiation sensing instruments without incurring exposure to ionizing radiation.

Another object of the present invention is to provide a computer simulator which can be used in place of actual radiation sources in laboratory training.

Still another object of the present invention is to provide a simulated radiation sensing instrument system which reduces the cost of health physics training.

Yet another object of the present invention is to provide a simulated radiation sensing instrument system which provides a wide variety of training situations.

Another object of the present invention is to provide a simulated radiation sensing instrument system which eliminates all safety hazards associated with the use and storage of actual radiation sources.

According to one aspect to the present invention, a computer system simulates the presence of various types of radiation sources in a variety of environments.

These and other objects, features and advantages according to the present invention are provided by a health physics instrument simulator system permitting an operator to simulate measurement of radiation levels of a plurality of radiation types. The health physics instrument simulator system includes a memory for storing first data corresponding to an n-dimensional training space representing a predetermined physical location, second data defining a radiation source including source strength, source type and source location with respect to the training space and a third data representing radiation intensity data based on the second data, where each of the radiation intensity data corresponds to a respective location in the training space, a selecting device for selecting a predetermined simulated radiation sensing instrument, a pointing device for identifying a location within the training space defining a current location of the simulated radiation sensing instrument and a display for displaying the simulated radiation sensing instrument as well as radiation intensity data corresponding to the current location of the instrument in the training space.

According to one aspect of the invention, the health physics instrument simulator system includes a processor for calculating the radiation intensity data based on the second data and a device for storing the calculated radiation intensity data. The n-dimensional training space can be a three-dimensional training space so that the predetermined physical location corresponds to, for example, a room including a floor, a plurality of walls, a ceiling, and objects which attenuate or shield the radiations. In the latter case, the radiation intensity data includes calculated direct radiation intensity data corrected for attenuation and calculated scattered radiation intensity data.

These and other objects, features and advantages according to the present invention are provided by a health physics instrument simulator system including a first storage device or memory means for storing data corresponding to an n-dimensional training space representing a physical location, a second storage device or memory means for storing data defining radiation sources by source strength, source type and source location with respect to the training space and a third storage device or memory means for storing radiation intensity data based on the radioactive sources, each radiation intensity data corresponding to a respective location in the training space. The three storage devices or memory means can be separate elements or a single memory having three addressable storage locations. The system also includes a selecting device for selecting one of a plurality of simulated radiation sensing instruments, a pointing device for identifying a current location within the training space and a display for displaying both an instrument display corresponding to the simulated radiation sensing instrument and radiation intensity data corresponding to the current location in the training space.

According to another aspect of the present invention, the health physics instrument simulator system employs measured radiation intensity data corresponding to the radioactive source position. The health physics instrument simulator system includes a first selecting device for selecting one of the predetermined simulated radiation sensing instruments, a second selecting device for defining an n-dimensional shielding object including the thickness and material of the shielding object. In addition, the pointing device can identify the current location within the training space and can identify a location of the shielding object with respect to the training space. Accordingly, the health physics instrument simulator system includes a processor or calculator receiving the data defining the radiation sources for calculating or processing the radiation intensity data based on the sources and the shielding object and for storing the calculated or processed radiation intensity data corresponding to a respective location in the training space in the third storage device or memory means.

These and other objects, features and advantages according to the present invention are provided by a health physics instrument simulator system including a computer and a display. The computer includes a first storage device or memory for storing data corresponding to an n-dimensional training space representing a predetermined physical location, a second storage device or memory for storing source data defining at least one radiation source including source strength, source type and source location with respect to the training space stored in the first memory, a third storage device or memory for storing radiation intensity data based on the source data. Each of the radiation intensity data corresponds to a respective location in the training space, and a device is provided for identifying a location within the training space defining a current location of a selected one of the simulated radiation sensing instruments. The display includes a selecting device for selecting one of a plurality of predetermined simulated radiation sensing instruments, a display device for displaying both an instrument display corresponding to the selected one of the simulated radiation sensing instruments and radiation intensity data corresponding to the current location in the training space and a transceiver device for transmitting the radiation intensity data from the computer to the display.

According to another aspect of the invention, the health physics instrument simulator system includes a device for sensing actual location of the display with respect to the physical location and for providing location data corresponding to the current location of the identifying device. The health physics instrument simulator system also includes an entry device for entering failure mode data for the selected one of the simulated radiation sensing instruments and a processor for processing the radiation intensity data based on the failure mode data to produce erroneous radiation intensity data. The failure mode data may include, for example, data representing device failures, such as a battery, resistor or other component failures, and can be simulated with a desired degree of detail. The failure mode data may also include, for example, instrument response data representing instrument performance failures or characteristics. For instance, some types of instruments will saturate or even reverse and read less as the intensity gets out of range. Such instrument performance failures or characteristics could also be simulated by entering the failure mode data. According to this aspect of the invention, the display device displays both the instrument display and the processed radiation intensity data and the transceiver device transmits the processed radiation intensity data from the computer to the display.

These and other objects, features and advantages of the present invention are provided by a method for operating a health physics instrument simulator system including a computer having a memory for storing data and a display device for displaying a simulated radiation sensing instrument and a simulated radiation intensity level corresponding to the simulated radiation sensing instrument. The method includes the steps of storing first data corresponding to a plurality of points defining an n-dimensional training space, second data corresponding to a least one radiation source including type of radiation, strength of radiation source and location with respect to the training space, and third data defining radiation intensity at selected ones of the points, selecting one of a plurality of the simulated radiation sensing instruments, identifying one of the points as a current location in the training space and displaying the selected one of the simulated radiation sensing instruments and radiation intensity corresponding to the current location.

The displaying step can include the steps of transmitting the third data from the computer to the display and displaying the selected one of the simulated radiation sensing instruments and the third data corresponding to the current location. According to one aspect of the inventive method, steps are provided for sensing a physical location of the display with respect to the training space, transmitting the physical location to the computer and identifying one of the points as a current location in the training space based on the physical location.

According to yet another aspect of the display step, provision is made for the trainee to select the type of instrument from a location in the training space. The storing step can include a step for calculating the third data based on the first and second data. Alternatively, the storing step can include steps for determining measured radiation data based on the second data and for mapping the measured data in a one-to-one correspondence with the points in the training space so as to produce the third data. Shielding data can also be specified during the storing step and this shielding data can be used in determining the radiation intensity reading displayed by the display device. This applies also to the case where third data is calculated.

These and other objects, features and advantages of the present invention are provided by a method for operating a health physics instrument simulator system including a computer having a memory for storing data and a display device for displaying a simulated radiation sensing instrument and a simulated radiation intensity level corresponding to the simulated radiation sensing instrument. The method includes the steps of storing first data corresponding to points defining an n-dimensional training space and second data corresponding to a radiation source including type of radiation, source strength and location with respect to the training space, calculating third data defining radiation intensity at each of the training space points based on the first and second data, selecting one of several simulated radiation sensing instruments, identifying one of the points as a current location in the training space and displaying the selected simulated radiation sensing instrument and the third data corresponding to the current location.

According to still another aspect of the inventive method, steps are provided for transmitting the third data from the computer to a remotely located display and displaying the selected simulated radiation sensing instruments and the third data corresponding to the current location on the remotely located display. The method can also include steps for sensing a physical location of the display with respect to the training space, transmitting the physical location to the computer and identifying one of the points as a current location in the training space based on the physical location.

According to another aspect of the inventive method, steps are provided for storing failure mode data defining a failure mode for a corresponding one of the simulated radiation sensing instruments and calculating the third data based on the first data, the second data and the failure mode data. Failure mode data can also be entered and used for adjusting a portion of the third data based on the failure mode data.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted throughout by like or similar numbers, and in which:

FIGS. 1A and 1B are diagrams illustrating a user interface according to a preferred embodiment of the present invention;

FIGS. 3A through 3C are diagrams illustrating simulated displays of varying resolutions;

FIG. 4 is a diagram illustrating the concept of a training space employed in the several embodiments of the present invention;

FIGS. 8A–8D are flowcharts illustrating essential steps of a method for providing the inventive simulated health physics instrument simulator.

DESCRIPTION OF THE PREFERRED EMBODIMENTS

The health physics instrument simulator system according to the present invention includes dedicated hardware and software for simulating a plurality of radiation detection instruments and their respective responses to one or more simulated radiation sources, e.g., simulated alpha, beta, gamma, x-ray and neutron sources. The health physics instrument simulator system advantageously includes three modules denoted as a Radiation Physics Laboratory module, a Surveyor module and an Examination module. It will be noted that computer simulation of real radiation environments advantageously can minimize or eliminate the need for radiation sources in training. In addition, simulation of how a health physics trainee determines the radiation risks in a contaminated environment can assist in training in a real situation, but without exposure to radiation.

Preferably, the health physics instrument simulator system includes a computer providing a user friendly menu-driven interface. The computer advantageously may be a personal computer employing an 80X86-type central processing unit (CPU), an 68XXX-type CPU or a CPU specifically configured to support the health physics instrument simulator system. The health physics instrument simulator system advantageously may include a hard disk and VGA graphics compatibility. In addition, a digital-to-analog convertor can be provided as an interface between the computer and dedicated radiation sensing instrument simulator. Description of this hardware is provided in greater detail below.

Referring to FIG. 1A, the health physics instrument simulator system advantageously includes a Radiation Physics Laboratory module, a Surveyor module and an Examination module, each of which can be selected from a pull-down menu shown in FIG. 1A. Preferably, the screen illustrated in FIG. 1B includes choices for selecting between on screen display and display on a dedicated radiation sensing instrument simulator. Thus, the health physics trainee starts by selecting the desired module and the desired display device. The menu shown in FIG. 1B is most appropriate for the surveyor module.

Figure 2:
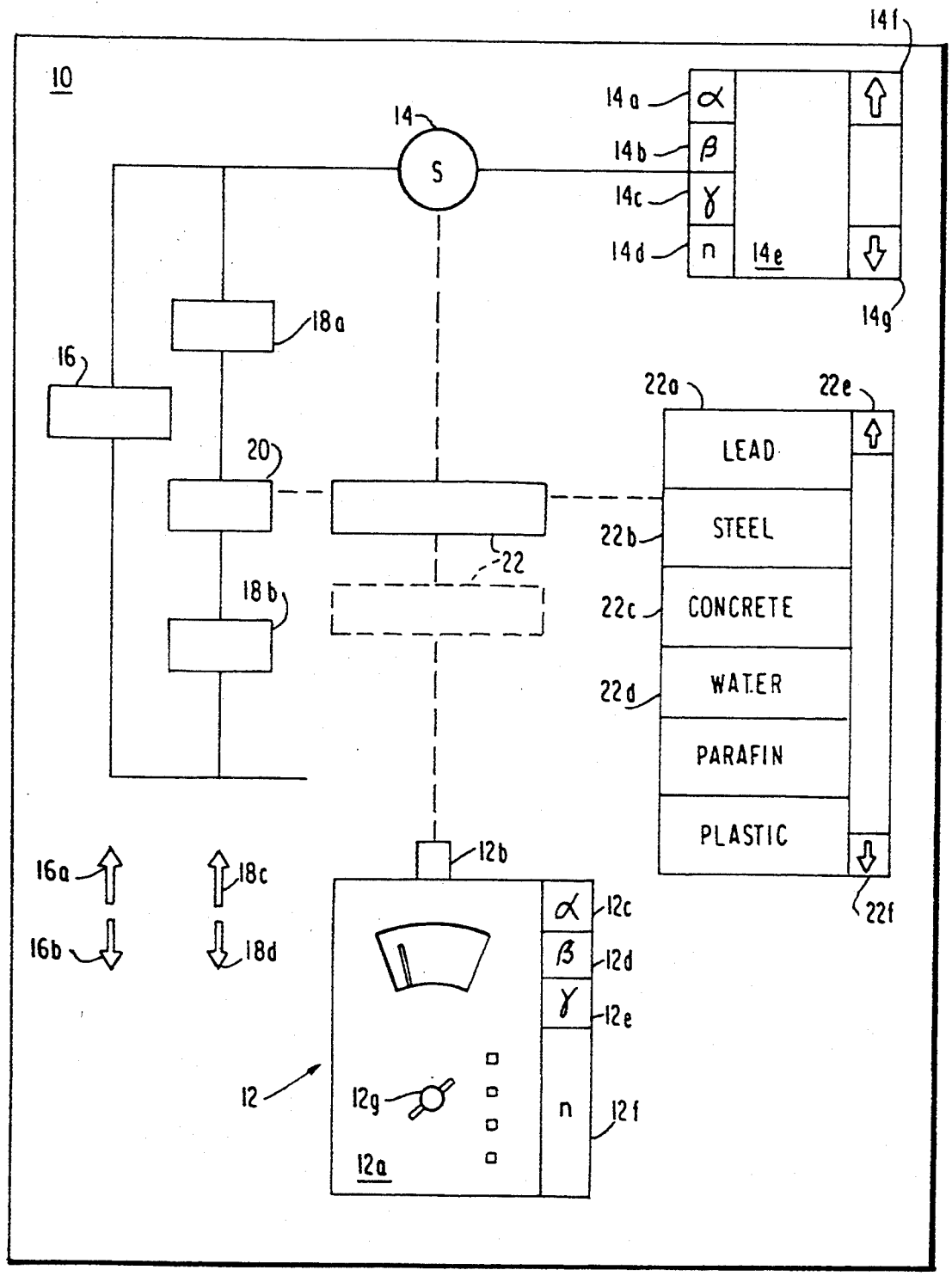
FIG. 2 is an illustrative diagram for explaining the Radiation Physics Laboratory module according to a preferred embodiment of the present invention.

In order to properly survey a contaminated area, an understanding of the principles of radiation physics is required. The Radiation Laboratory module advantageously teaches these basic elements of radiation physics to the health physics trainee. Preferably, the health physics trainee can select from alpha, beta, gamma and neutron laboratories or can select a combined laboratory. The laboratory modules demonstrate (1) Radiation Penetrations, (e.g., ranges of alpha particles or beta rays);
(2) Shielding Attenuation Factors for gamma rays and neutrons;
(3) Scattering Phenomena;
(4) Inverse Square Law (Distance) Effects;
(5) Instrumentation Response to All Types of Radiation;

For example, the health physics trainee will be able to see a source i.e., a selected alpha, beta, gamma and neutron source, and an instrument on the screen, as shown in FIG. 2. The health physics trainee can place various shields of differing thicknesses between the source and the instrument. The resultant decrease in the radiation intensity data from the source can then be observed, plotted, and studied. This will teach the effects of shielding on various sources. It should be understood that there are several factors which affect how radiation from a source is transmitted to a detection point. Specifically, the type of radiation and energy are critical factors. In addition, the distance between a radiation source and a sensor or detection point and intervening materials that could shield radiation by scattering or by absorption are also very important factors. All of these and other appropriate factors known in the art can be implemented in the simulator system of the invention.

In an exemplary case, the Radiation Laboratory module can be implemented on a computer display screen 10, as shown in FIG. 2. A simulated radiation sensing instrument 12 is displayed at one side or end of screen 10 opposing a simulated radiation source 14. Preferably, simulated radiation sensing instrument 12 includes a simulated body 12a and a sensor 12b. Portions of the display denoted 12c through 12f advantageously can be used to determine the type of simulated radiation sensing instrument being displayed on screen 10. Simulated knob 12g can be used to select the operating range of simulated radiation sensing instrument 12. Preferably, the type of radiation provide by simulated radiation source 14 can be selected using source selectors 14a through 14d while the source strength can be controlled using arrows 14e and 14f.

The distance between simulated radiation sensing instrument 12 and simulated radiation source 14 advantageously can be controlled by operation of arrows 16a and 16b. The simulated distance between simulated radiation sensing instrument 12 and simulated radiation source 14 can be displayed on display area 16.

The effect of shielding 22 on the intensity level detected by simulated radiation sensing instrument 12 advantageously can be demonstrated by selecting a shielding material using shield selectors 22a through 22d while controlling the simulated thickness of the shielding using arrows 22e and 22f. Preferably, the thickness is displayed in display area 20. The position of one or more of the simulated shielding materials can be controlled using arrows 18c and 18d, with the results being displayed by display areas 18a and 18b. It will be appreciated that the sum of the values displayed in display areas 18a and 18b is equal to the separation distance displayed in display area 16.

It will be appreciated that the various devices and areas illustrated on screen 10 are portrayed based on information stored and processed in the personal computer. A pointing device, which advantageously can be a mouse, cursor keys, a light pen, a joystick, moves a cursor to a position on screen 10 corresponding to, for example, arrow 16b. For example, clicking one of the buttons on the mouse while the cursor is over arrow 16b instructs the computer to simulate increasing the distance between simulated radiation source 14 and simulated radiation sensing instrument 12 using well known computer control techniques.

Other instruments such as particle spectrometers fed into multichannel analyzers advantageously can be displayed in place of simulated radiation sensing instrument 12. Various displays, such as those shown in FIG. 3A through 3C, advantageously can be displayed to teach other aspects of radiation monitoring including instrument resolution, range selection and reading techniques. In the exemplary case illustrated in FIGS. 3A through 3C, health physics trainees advantageously can study and learn techniques for displaying and measuring an energy spectrum of a source. Suppose, for example, that the source emits gamma rays of two discrete energies. If the instrument has very high resolution the spectrum might resemble that shown in FIG. 3A. If the resolution is less, the displayed spectrum would be similar to that shown in FIG. 3B. Still less resolution would be simulated by the exemplary display shown in FIG. 3C. This type of display would be particularly advantageous for teaching effects of instrument resolution. Further, changes in source spectra due to changes in distance between source and detector or the thickness of shielding material could be taught. Further, types of gamma ray interactions with matter, such as the photoelectric effect, compton scattering, and pair production could be simulated. In addition, various unfolding techniques known to those skilled in the art could be used to analyze a spectrum to determine the energies of the sources. Background noise could also be inserted to provide practice in subtracting background signals from the detected radiation. Statistical noise advantageously could also be inserted and various smoothing techniques could be implemented in the health physics instrument simulator system. Preferably, multiple spectra could be superimposed to permit teaching recognition techniques for individual radionuclides within the source by comparing the relative positions and relative heights of the peaks from a given radionuclide.

It will be noted that, as with other features of the present invention, the spectrum could be displayed on the computer screen or on a separate display connected to the computer by cable or transmitter device, as discussed in greater detail below.

Further, in the radiation laboratory embodiment, software submodules or "plug-ins" could be employed. For example, a plug-in on each of the following could be provided rate of decay of an isotope to illustrate half-life
build up of daughter-atoms
range of alpha particles
range of beta particles
backscattering of beta rays
penetration of x-rays and gamma-rays
transport of thermal and fast neutrons
depth dose in tissue
concepts of microdosimetry
techniques for spectral analysis The plug-ins dealing with decay rates or the build-up of daughters would require simulation of radiation data in the time dimension. For instance, the time scale could be chosen according to the half-life of the isotope of interest, so that decays ranging from microseconds to millions of years could be simulated. For example, at any chosen location in cartesian space, the student could simply let a clock run at any location to see the time behavior of the radiation field. In this regard, a further simulation effect could be that the effective decay time would depend on location if more than one isotope has been simulated, because of individualized attenuation of the various radiations. (The time parameter is also valuable in the surveyor module, since it would allow specification of dose as a function of both space and time, i.e., $F(x,y,z,t)$ and this could be used to teach the art of keeping the dose as low as possible while carrying out a hazardous mission.)

Referring to FIG. 1B, pull-down menus for the Surveyor module advantageously permit the health physics trainee to display a training area or space and to change radiation environments, zoom in and out on particular sections of the environment, select the type of instrument in use, select the type of display (on screen or external), and exit the system.

The radiation environment is defined to include three basic components, the training space representing the area to be surveyed, simulated radiation source data and radiation intensity data. All three of these components advantageously can be based on real examples drawn from actual laboratory measurements. The training space contains information on the placement of objects in the environment, yielding a graphic display of the radiation environment such as that shown in FIG. 4, which is discussed in greater detail below. The simulated radiation source data specifies the location of simulated sources in the environment. Finally, the radiation intensity data contains information about dose levels at specific places in the training space. The intensity data can represent several quantities used in Health Physics. For example, the intensity data could represent flux (i.e., particles per unit area and per unit time), exposure dose in air, tissue dose, biological dose, etc. It could also define a spectrum of particles representing radiation quality, or other quantities useful in one or more aspects of Health Physics. It will be appreciated that while intensity data usually represents time rates, the display could also represent quantaties accumulated over any period of time.

Preferably, the three components discussed above can be developed simultaneously from real data generated in the laboratory, although these components advantageously can be generated by calculations, or by a combination of both.

In an exemplary case, the radiation intensity data, i.e., the readings displayed on the simulated radiation sensing instruments by the computer, can be determined by actual measurements in a physical location corresponding to the training area depicted on the screen. The actual radiation intensity data can then be scaled by the computer with respect to various source strengths. For example, when a gamma instrument is in a neutron field it will read a false response due to neutrons. The degree of unwanted neutron response will scale with the neutron intensity. On the other hand, many types of neutron instruments will exhibit an unwanted response to gamma radiation. However, the degree of gamma response does not scale with gamma intensity; rather, it usually is some power function. The simulations according to the present invention take into account the actual magnitude of the radiation fields. Radiation transport calculations advantageously may be implemented to predict the reading that would be obtained by the simulated radiation sensing instrument at a given location, which permits greater flexibility for the instructor in designing training spaces and source configurations. In this regard, it should be noted that radiation transport calculations using elaborate shields is a high developed art which can be fully implemented in the simulations.

After the various startup selections are made by the health physics trainee, the Surveyor module displays a graphic representation, such as is shown in FIG. 4, that enables the health physics trainee to position him/herself at any point in the training space using a pointing device, e.g., a mouse, cursor keys, a light pen, a joystick, etc. As discussed above, the radiation environment is defined as an area, e.g., a room, a building, a field, etc., together with data indicating the types of radiation sources and their strengths at each possible survey point.

It will also be apparent that the surveyor module is not limited to discrete sources of alpha, beta, gamma and neutron sources and corresponding detectors. Airborne radiation monitors advantageously can be displayed and manipulated using computer displays adapted for teaching various aspects of airborne contamination. For example, airborne contamination, such as in a cloud released from a nuclear reactor or weapon could be simulated. As shown in FIG. 1B, there are three radiation modes which the trainee can select from surface, discrete and airborne.

FIG. 4 is a diagram illustrating a computer screen 100 containing a two-dimensional training space 112 defined by walls 114*n* and a doorway 116. A plurality of objects, generally denoted 118 are defined within training space 112 and represent objects which can be expected to be found in a typical room depicted by training space 112. The computer screen 100 could also employ a three-dimensional graphic representation of the training space to provide the trainee with a more realistic look and feel of the training space. Preferably, one or more radioactive sources are defined within training space 112. In the exemplary case illustrated in FIG. 4, an alpha source 120, a beta source 122, a gamma source 124 and a neutron source 126 are defined as being located at various positions around training space 112.

It will be appreciated that sources 120, 122, 124 and 126 their source type, e.g., gamma radiation, and their source strength are defined with respect to their location within training space 112. It will also be noted that shielding objects, for example, shielding wall 128, can also be defined in training space 112. Shielding object definitions advantageously can include the location of the object in training space 112, thickness of the shielding object and the material from which the shielding object is supposedly constructed. Further, it should be understood that the shielding data could represent that only air is disposed between the radiation source and the detection point.

Preferably, a survey point selected by an operator can be displayed in training space 112. In the exemplary case illustrated in FIG. 4, an icon 130, illustrating an operator 130*a* holding a survey meter 130*b* advantageously can be used to indicate the survey point.

Both the simulated radiation source data and radiation intensity data are correlated to the X and Y, and in some cases Z, coordinates of the training space. For each coordinate point (x,y) or (x,y,z) in the training space, four associated values for alpha, beta, gamma and neutron simulated radiation sources can be provided as simulated radiation source data. In addition, based on the specified simulated radiation source data, data representing radiation intensity data for each point in the training space is generated. It will be appreciated that when actual radiation data is used, the simulated instrument location data can be used as address data for addressing actual data provided in, for example, a look up table. A capability is included to interpolate the data in the look up table to provide radiation intensity data at intermediate points. When a trainee selects a point in the training space, data from the radiation environment corresponding to radiation intensity data for that point are retrieved. As the survey progresses, the trainee can use the Record option to see the dose levels for the alpha, beta, gamma and neutron simulated radiation intensities displayed at trainee selected locations on the screen.

The health physics instrument simulator system advantageously includes the capability to randomly retrieve or display incorrect information for the health physics trainee as readings or measurements are taken. This provides a simulated instrument malfunction to familiarize health physics trainees with this possibility. It will be appreciated that instrument failures are difficult to simulate in conventional training systems.

In an exemplary case, when the trainee selects the example shown in FIG. 4, a two-dimensional graphic rendition of the radiation environment is displayed. The sources are positioned at this time and are displayed or not displayed depending on the trainee's selected level of expertise, i.e., Beginner, Intermediate or Expert. The trainee can then use an attached pointing device to locate him/herself in the environment. When a location is selected, the information retrieved from the portion of the radiation environment data base corresponding to radiation intensity data is displayed.

When the "Display On Screen" option is initially selected, the radiation intensity data for the selected simulated radiation sensing instrument located at the selected survey point is displayed on the screen by a simulated instrument panel, i.e., the simulated radiation sensing instrument. When, the "Display External" has been selected, the information will be sent, in another exemplary case, via a transmission path, which may advantageously include a digital-to-analog converter, to an external simulated radiation sensing instrument in the hand of the trainee, as discussed in greater detail below.

The Mode options illustrated in FIG. 1B bring together several options critical to the operation of the system. Since alpha and beta sources generally have short ranges, they usually will only be detected near the surface of objects, thus the surface option can be used. The airborne option allows the health physics trainee to learn how to survey radioactive contamination released in the atmosphere. Preferably, the Direction and Rotation options can be used to specify the direction of the surveying instrument and allow the rotation of the instrument. After the health physics trainee has ascertained the location of sources, the Reveal Sources option can be used to show the location of unknown sources to verify the trainee's ability. Similarly, the Hide Sources option can be used to remove the sources from the visual display of the training space.

The ZOOM-IN/ZOOM-OUT and Full View selections allow the health physics trainee to isolate and view smaller sections of the training space. Zoom features are especially important when alpha surveys are being simulated, since these particles have a very short range. It will be noted that this is also an example where three-dimensional coordinates are required for effective simulation.

For any radiation environment, the trainee is required to select the types of instruments needed to ascertain the types of sources deployed. e.g., alpha, beta, gamma and neutron sources, and to determine other parameters of the radiation environment. It should be noted that an incorrect choice in the type of instrument is one of the errors that can be made in health physics.

As discussed above, options are provided for displaying this information in two ways: (1) on the screen and/or (2) on an external simulated radiation sensing instrument connected to the computer via a cable or other transmission medium. When computer screen display is selected, it does not require the additional hardware needed for an external simulated radiation sensing instrument, thus lending portability to a system which can be used anytime and anywhere. An external simulated radiation sensing instrument, however, provides the look and feel of an actual survey instrument.

In addition, information may be displayed using (3) a hand-held sensing instrument which receives a wireless transmission such as an infrared transmission. Further, the information may be displayed using (4) a stationary display that can receive and send information to the computer. The stationary display would be useful in setting up an "area monitor" in which the trainee could select the type of instrument and other information remotely. An "area monitor" could be used to simulate monitors throughout a plant site or environment. These "area monitors" could send an identification message to the simulation computer which in turn would reply with the simulated radiation dose. Such a bi-directional scheme could be used in wired or wireless versions.

Preferably, the Surveyor module operates in one of three modes: (1) Beginner; (2) Intermediate; and (3) Expert. The display of information on the sources deployed in the environment is tied to the level of expertise chosen by the health physics trainee. For instance, a Beginner will have all simulated radiation source types, strengths, and locations revealed, an Intermediate user will have a mix of known and unknown simulated radiation sources, while the expert will have all simulated radiation sources unknown. At the Expert level, the trainee will learn how to determine the risks in "mixed radiation" fields, such as fast neutrons and gamma rays. Therefore, a mix of known and unknown sources will provide close to real simulation. Help messages and suggestions advantageously can be provided, through a user-friendly interface, based on the trainee's level of expertise, to help the health physics trainee move through the process from Beginner to Expert.

The Examination module advantageously employs the Surveyor module as a basis for determining the health physics trainee's ability to operate in a hazardous environment. For example, the trainee can be given a predetermined number of moves and a predetermined number of readings which can be taken in order to determine the location, number, type, and strength of sources in the radiation environment. It will be apparent that this requires knowledge of such things as the inverse square law, shielding, and scattering of radiation. The survey readings taken by the trainee are recorded so that a subsequent critique by trainers or supervisors can be provided. The results for each trainee advantageously can be accumulated so that the trainee's progress can be tracked.

For the Examiner module, the system could include examination of the subject materials of both the surveyor and the radiation laboratory. Implementation of the examiner module could involve simulation of the time dimension. Further, for instance the surveyor examination could be approached as a computer game, in which the trainee is asked to solve a problem with a specified or minimum number of clues (readings taken by design or by the student choice). For example, an examination on the radiation laboratory could be to require selecting an answer from multiple-choice within a specified time interval. If the student is really confident, he or she could set a shorter time for the quiz to correspondingly increase the score. An instructor could examine the moves made by the student from the computer records and could use this information to help grade the student or to suggest improvements. Evaluations of this type could be especially meaningful in situations of simulated duress. Such records could be valuable for determining psychological or emotional readiness of the student for emergency or rescue work.

Preferred embodiment of the present invention will now be described while referring to FIGS. 5 through 8.

Figure 5:
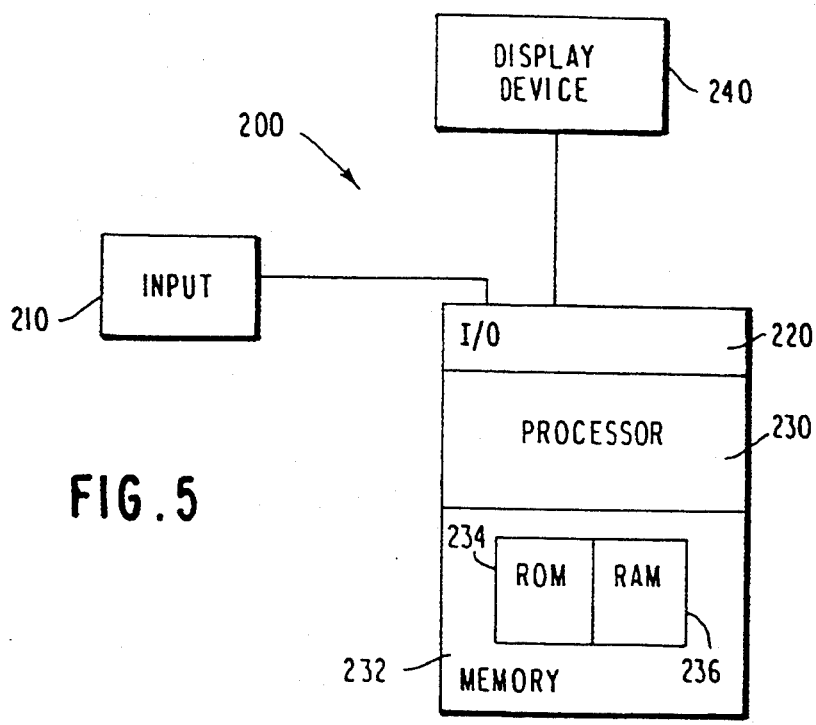
FIG. 5 is an illustrative block diagram of a health physics instrument simulator system according to a preferred embodiment of the present invention.

Referring to FIG. 5, a first preferred embodiment of the present invention is provided by a health physics instrument simulator system 200 which includes at least one entry device 210 connected to a processor 230 through an input/output (I/O) device 220. It will be noted that entry device 210 advantageously can be a key board, a mouse, a light pen, a joystick, a touch screen, etc. Preferably, processor 230 is connected to system memory 232, which includes a read only memory (ROM) 234 storing fixed programming and data and a random access memory (RAM) 236. ROM 234 advantageously can be a commercially available ROM, e.g., a CD-ROM, while RAM 236 can be provided as a commercially available storage devices, e.g., RAM chips, static RAM (SRAM) chips, floppy disks and hard disks. Processor 230 is connected to a video display device 240 via I/O 220. In an exemplary case, display device 240 is a well known VGA-type computer monitor.

System memory 232 advantageously includes three storage areas for storing the individual components of the radiation environment data base. It will be noted that the three storage areas can all be provided by ROM 234 when fixed training problems are to be employed or can all be provided by RAM 236 when specially developed problems, such as final examinations, are to be provided. Preferably, selected portions of the radiation environment data base, e.g., the data defining the training space, can be stored in ROM 234 while variable portions of the radiation environment data base, e.g., the simulated radiation source data and the radiation intensity data for a specific problem, are stored in RAM 236.

Figure 6:
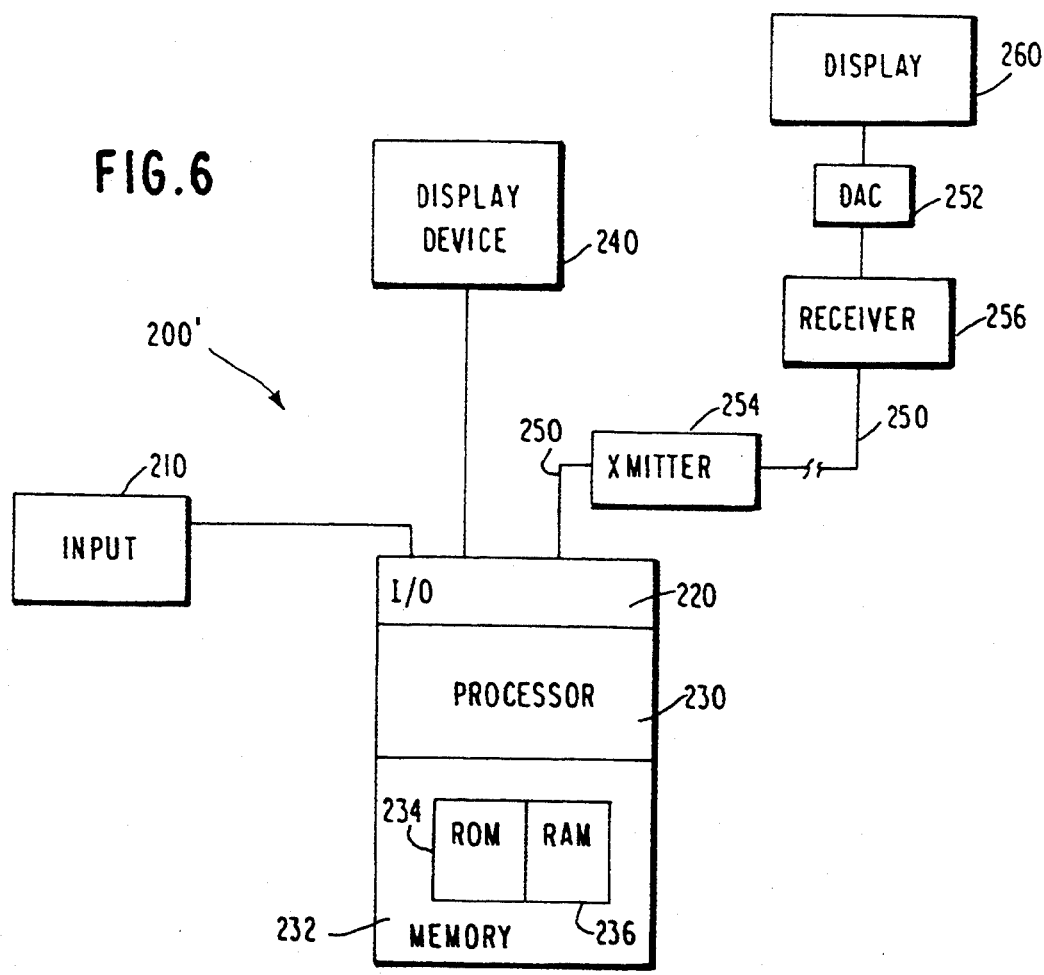
FIG. 6 is an illustrative block diagram of a health physics instrument simulator system according to another preferred embodiment of the present invention.

Referring to FIG. 6, another preferred embodiment according to the present invention is provided by a health physics instrument simulator system 200' which includes at least one entry device 210 connected to a processor 230 through an input/output (I/O) device 220. Processor 230 is connected to system memory 232, which again includes a ROM 234 and a RAM 236. Processor 230 is also connected to a video display device 240 via I/O 220, as described with respect to FIG. 5. Preferably, processor 230 is connected via I/O 220 and transmission path 250 to a remote display 260. It will be noted that display 260 acts as the simulated radiation sensing instrument in this embodiment while display device 240 acts as the simulated radiation sensing instrument in the embodiment illustrated in FIG. 5.

In an exemplary case, transmission path 250 includes a digital-to-analog converter (DAC) 252, shown by dashed lines, for converting digital data produced by processor 230 to an analog signal suitable for driving an analog meter movement 262 located in display 260. It will be also be appreciated that display 260 may advantageously be responsive to digital signals so that DAC 252 can be omitted. In an exemplary case, display 260 advantageously can include a liquid crystal display for simulating the meter face of a variety of simulated radiation sensing instruments. It should also be noted that transmission path 250 may be either a hard wired signal path or, as shown in FIG. 6, a signal path including a transmitter 254 connected to I/O 220 and a receiver 256 connected to display 260. The transmitter could be a type which transmits analog signals. In this case, the DAC would be connected between the transmitter and the output of the I/0 220. In the case in which the transmitter transmits digital signals, DAC 252 is advantageously located in transmission path 250 downstream of the receiver 256.

Figure 7:
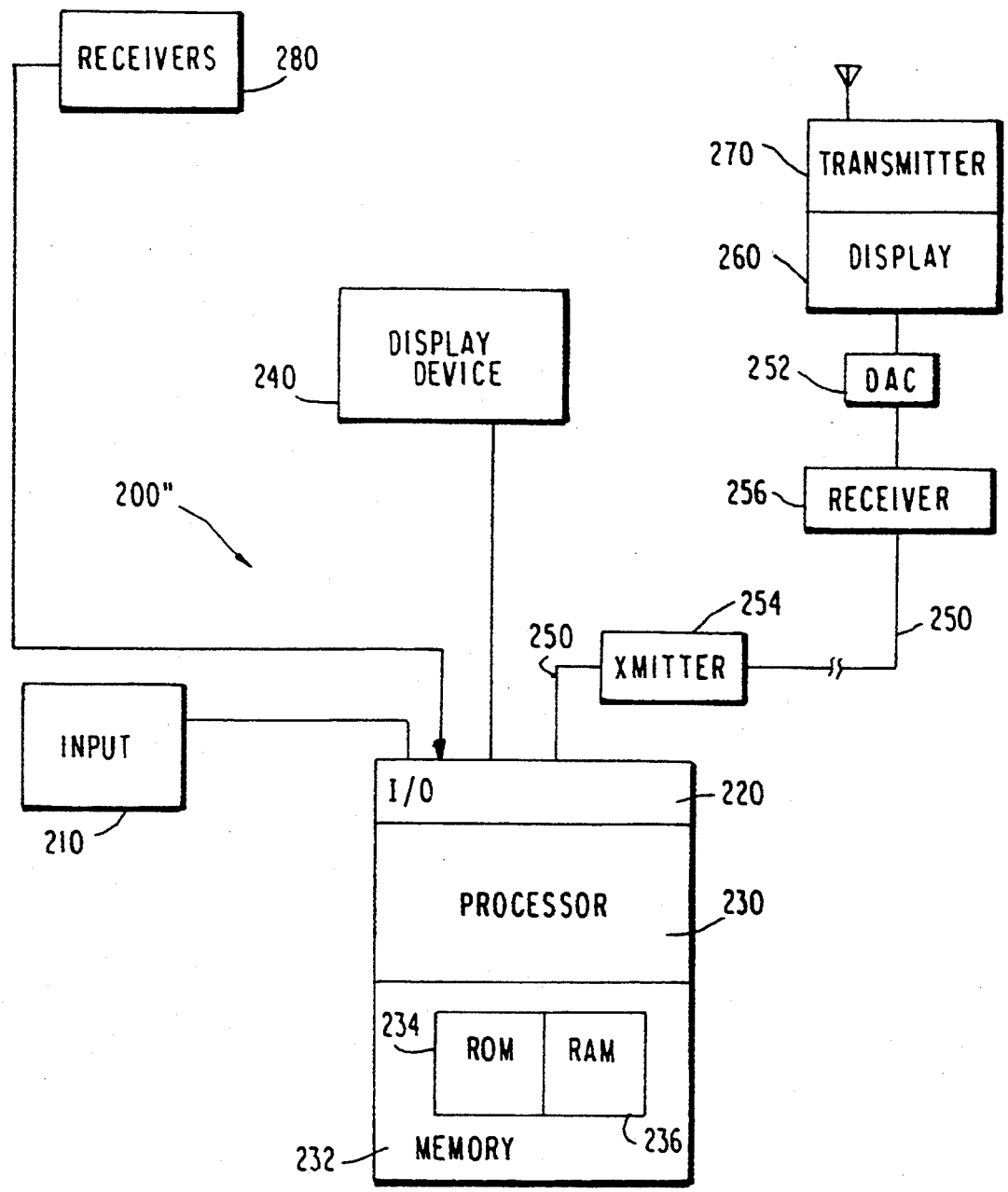
FIG. 7 is an illustrative block diagram of a health physics instrument simulator system according to yet another preferred embodiment of the present invention.

Referring to FIG. 7, yet another preferred embodiment according to the present invention allows the health physics trainee to walk through a "studio area" carrying a simulated radiation sensing instrument while the health physics instrument simulator system senses the position of the simulated radiation sensing instrument and transmits simulated readings to be displayed on the simulated radiation sensing instrument in accordance with the sensed position. The "studio area" may simulate a nuclear reactor, a nuclear submarine, an accelarator, a radiation medical facility or any other area where training is necessary The "studio area", along with the simulated sensing instrument provides the trainee with the look and feel of an actual survey site as well as an actual sensing instrument. The "studio area" may also include an "area monitor" as discussed above. The studio embodiment is an effective simulation for surveyor training. Further, the studio embodiment could also be a place where examinations on the surveyor could be given in a near-real setting.

The health physics instrument simulator system 200 of FIG. 7 includes all of the components illustrated in FIG. 6 as well as a transmitter 270 and a plurality of position sensors 280 permitting the location of the instrument to be sensed by, for example, ultrasound or infrared signals. If, for example, an infrared transmitter 270 is used, along with a display 260 which can receive digital signals, then DAC 252 could be eliminated. Preferably, the processor 230 determines the reading that should be displayed on the instrument and transmits this information to receiver 256 for display by display 260. It will be appreciated that position sensors 280 advantageously are connected to processor 230 via I/O 220 to permit processor 230 to calculate the position of display 260 in the training space. The technology for such a capability already exists. One such system is marketed by Chemrad Tennessee Corporation under the name Ultra Sonic Range and Data System (USRADS). USRADS was developed for surveying contaminated sites where the surveyor walks through the area and the coordinates are determined by ultrasonic receivers. The data read by the instrument is then transmitted to a computer, located off site, and the data is automatically recorded along with the coordinates. USRADS is disclosed in U.S. Pat. No. 4,924,450, which is incorporated, by reference, for all purposes. The system according to this embodiment advantageously permits transmission of the reading from the computer to the instrument for display. Specifically, a communication link can be provided between the computer and the simulated sensing instrument for allowing two-way communication between the computer and the simulated sensing instrument. The communication link may be a wired link, such as, for example, a cable, or a wireless link, such as, for example, an RF link, infrared or ultrasound. Specifically, the simulated sensing instrument would transmit position data to the computer representing the present actual location of the simulated sensing instrument in the "studio area". The computer would, in response, transmit data to the simulated sensing instrument representing the reading that should be displayed or recorded by the simulated sensing instrument.

Operation of the health physics instrument simulator system according to the present invention will now be described while referring to the flowchart shown in FIG. 8 which illustrates the surveyor module.

During Step 100, the health physics instrument simulator system is initialized using, for example, the pull down menu shown in FIG. 1A. During Step 100, the health physics trainee advantageously can select the mode of operation, i.e., the surveyor module, as well as the experience level. Then, during Step 200, selected ones of first data corresponding to a plurality of points defining an n-dimensional training space, second data corresponding to a least one radioactive source including type of radiation, strength of radiation and location with respect to the training space, and third data defining radiation intensity at selected ones of the points are stored in memory. It will be appreciated that first, second and third data for canned problems or examples may advantageously be stored in advance in ROM 234.

During Step 300, the health physics trainee selects one of a plurality of the simulated radiation sensing instruments for sensing simulated radiation intensities.

Next, during Step 400, the health physics trainee identifies one of the points as a current location in the training space. After that, during Step 500, the processor 230 displays the selected one of the simulated radiation sensing instruments and radiation intensity corresponding to the current location.

In an exemplary case, Step 200 includes a subroutine for determining the third data which is stored in memory 232. Thus, during Step 201, the first and second data are stored in memory 232. Then, during Step 202, processor 230 calculates the third data based on the first and second data and stores the third data in memory 232. It will be noted that the third data advantageously can be calculated for each point in the n-dimensional training space defined by the first data. Alternatively, a minimum set of third data, e.g., third data for every tenth point in the training space can be generated. In that case, when Step 500 is to be performed, the third data is interpolated by processor 230 prior to being displayed on display device 240 or display 260.

Step 200 advantageously can include an alternative subroutine for determining the third data. In this subroutine, the first and second data are again stored in memory 232. However, in this case, processor 230 determines measured radiation data based on the second data. Preferably, processor 230 uses instrument location data to retrieve measured data from the look up table, and it interpolates data for the intermediate locations.

It should also be noted that Step 200 advantageously can include a Step for specifying shielding data defining one or more shielding objects including shielding thicknesses and shielding materials in the training space. Preferably, shielding data makes a portion of the first data, although shielding data can alternatively be specified as a portion of the second data. It should be noted that the shielding data can represent that only air is disposed between the radiation source and the sensing instrument. When shielding data is defined, Step 500 advantageously displays the selected one of the simulated radiation sensing instruments and a radiation intensity reading based on the third data corresponding to the current location and the shielding data.

In an exemplary case, the third data may be overwritten by failure data including data representing instrument response so that a simulated radiation sensing instrument failure and/or response may be included as part of a training exercise. Thus, after the third data is determined according to Step 200, the trainee or an instructor advantageously can identify one of the simulated radiation sensing instruments as being in a failed condition and/or in a specific response pattern. Preferably, failure data are retrieved from a lookup table in ROM 234 or RAM 236 and this failure data is then stored in memory 232. The failure mode can be activated via entry device 210.

When the health physics instrument simulator system illustrated in FIG. 7 is employed, Step 400 advantageously includes a subroutine for determining the position of display 260 with respect to the training space. During Step 410, the physical location of the display 260 with respect to the training space is sensed, in an exemplary case, using transmitter 270 and detectors 280. The physical location thus determined is transmitted to processor 230 via I/O 220 during Step 412. Then, during Step 414, the processor 230 identifies one of the points defining the training space as the current location in the training space based on the physical location determined in Step 410.

In the event that the health physics instrument simulator system is configured according to either FIG. 6 or FIG. 7, Step 500 includes a subroutine for transferring the third data corresponding to the current location to display 260. During Step 510, the third data is transmitted from processor 230 via I/O 220 and transmission path 250 to display 260 so that display 260, during Step 512, displays the selected one of the simulated radiation sensing instruments and the third data corresponding to the current location.

Of course, simulations or laboratory measurements with weak sources are not designed to completely eliminate field experience, since qualification under field stress is the ultimate test. Simulations can, however, provide the opportunity for a wide variety of situations (including hazardous environments) in complete safety.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention. For example, while the present invention has been described with respect to a training simulator system for simulating an environment having radioactive radiation sources, the invention is also applicable for training in other hazardous environments. The invention is also applicable for training in non-hazardous environments. For example, the simulation system of the present invention could be used for training personnel or students on expensive equipment. This would eliminate the need to purchase such expensive equipment or to use existing equipment for training purposes.

What is claimed is

1. A health physics instrument simulator system, comprising:
    a computer for storing simulated radiation intensity data for an n-dimensional training space representing a physical location, each of said stored simulated radiation intensity data corresponding to a respective position in the physical location; and
    a simulated radiation sensing instrument, coupled to said computer, and being within the physical location, said simulated radiation sensing instrument including a recording unit for recording a simulated radiation reading, and a position sensing device for providing position information to said computer representing a present position of said simulated radiation sensing instrument in the physical location;
    said computer supplying, in response to the position information provided by said position sensing unit, that stored simulated radiation intensity data which corresponds to the provided present position information to said recording unit of said simulated radiation sensing instrument.

2. The simulator system as defined in claim 1, wherein said simulated radiation sensing instrument is coupled to said computer through a wireless link.

3. The simulator system as defined in claim 1, wherein said simulated radiation sensing instrument is coupled to said computer through a cable link.

4. The simulator system as defined in claim 1, wherein said simulated radiation sensing instrument is movable within the physical location.

5. The simulator system as defined in claim 4, wherein said movable simulated radiation sensing instrument is coupled to said computer through a wireless link.

6. The simulator system as defined in claim 4, wherein said movable simulated radiation sensing instrument is coupled to said computer through a cable link.

7. The simulator system as defined in claim 1, wherein the n-dimensional training space is at least a three-dimensional training space.

8. The simulator system as defined in claim 1, wherein said simulated radiation sensing instrument is fixed.

9. A health physics instrument simulator system, comprising:
    a computer for storing simulated radiation intensity data for a simulated n-dimensional training space, each of said stored simulated radiation intensity data corresponding to a respective position in the simulated training space;
    a display, coupled to said computer, for displaying the simulated training space and a simulated radiation sensing instrument in the simulated training space; and
    an input unit for causing said displayed simulated radiation sensing instrument to move within the displayed simulated training space, and for providing position information to said computer representing a present position of said simulated radiation sensing instrument in the simulated training space;
    said computer supplying to said display, in response to the position information provided by said input unit, that stored simulated radiation intensity data which corresponds to the provided present position information.

* * * * *